United States Patent [19]

Pontarella

[11] 4,044,760
[45] Aug. 30, 1977

[54] TENDON SHIELD AND METHOD OF MAKING THE SAME

[76] Inventor: Armand Pontarella, 36 Lansing Circle North, Rochester, N.Y. 14624

[21] Appl. No.: 666,631

[22] Filed: Mar. 15, 1976

[51] Int. Cl.² .............................................. A61F 13/00
[52] U.S. Cl. .................................. 128/82; 128/89 R; 54/82
[58] Field of Search .................. 128/165, 87 R, 89 R, 128/83, 82; 54/82; 119/96

[56] References Cited

U.S. PATENT DOCUMENTS

| | | | |
|---|---|---|---|
| 342,430 | 5/1886 | Curtis | 54/82 |
| 458,804 | 9/1891 | Ellis | 128/89 R |
| 3,209,517 | 10/1965 | Hyman | 128/165 X |
| 3,405,506 | 10/1968 | Kostur | 54/82 |

FOREIGN PATENT DOCUMENTS

| | | | |
|---|---|---|---|
| 264,305 | 1/1927 | United Kingdom | 54/82 |

*Primary Examiner*—John D. Yasko
*Attorney, Agent, or Firm*—Stonebraker, Shepard & Stephens

[57] ABSTRACT

A tendon shield is provided for injured tendons in the legs of horses. The shield is made of plastic material shaped to fit snugly against the affected part of the horse's leg, and is held in place by a wrapping which is wrapped tightly around the leg and shield. A method of making the shield is described, to insure that the shield is properly shaped to fit snugly against the leg. A cast of the affected part of the leg is first made, using epoxy resin or the like to form a negative cast of the affected part of the leg. Then a cast or mold of ceramic or other suitable material is made from the negative epoxy cast, and is fired or otherwise treated, if necessary, to harden it, so as to form a rigid positive cast duplicating the shape of the leg. Then a plastic sheet is heated to soften it and shaped to the exterior shape of the positive cast, so that the concave portion of the plastic sheet is accurately shaped to fit the horse's leg. The plastic sheet after being thus formed is removed from the cast and applied to the leg of the horse and held thereon by a tight wrapping.

3 Claims, 8 Drawing Figures

TENDON SHIELD AND METHOD OF MAKING THE SAME

BACKGROUND OF THE INVENTION

When a horse has a bowed or otherwise damaged tendon, the accepted treatment customarily employed is to turn the horse out to pasture for an extended period of time, and then to race it very lightly to avoid a recurrence of the injury. Many times the horse that has a bowed tendon cannot be trained hard enough to race effectively again.

The tendon shield of the present invention allows a horse with a bowed tendon to continue racing effectively without incurring further injury or pain. The shield is made to fit every contour of the horse's leg in the area of the bowed tendon, thus giving the tendon a firm support and keeping it from further damage. The shield must be made of a very light weight yet strong material, able to withstand a large variance in temperature and weather conditions. According to the invention, the shield is made of plastic sheeting, heated and formed around a positive mold which is a duplicate of the leg of the horse, the positive mold having been made of rigid ceramic material from a negative mold made from epoxy resin or the like or other suitable cast material placed directly against the affected part of the leg of the horse.

DESCRIPTION OF THE PREFERRED EMBODIMENT

Figure 1:
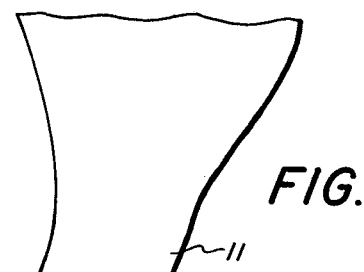
FIG. 1 is a schematic side elevation of the leg of a horse with a shield according to a preferred embodiment of the invention applied to such leg and held thereon by wrapping.
Figure 4:
FIG. 4 is a section taken substantially on the line 4—4 of FIG. 3.
Figure 2:
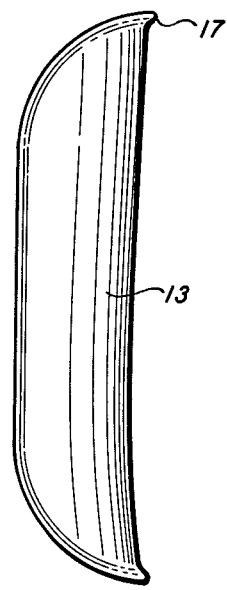
FIG. 2 is a side elevation view of a typical shield made to fit a particular leg of an individual horse, the shape of the shield varying slightly from one horse to another.
Figure 3:
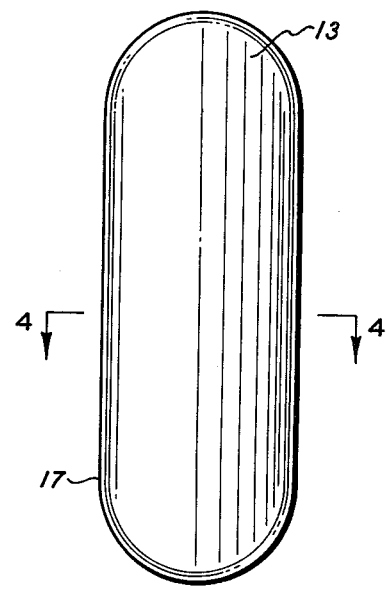
FIG. 3 is a front elevational view of the same.

Referring now to FIG. 1, a portion of a leg of a horse is shown at 11. The portion or area of the leg where a tendon has been injured is covered tightly by the shield 13 of the present invention, held in place by a tight wrapping 15. The shield itself, as best seen in FIGS. 2–4, comprises a sheet of firm or rigid material which can be formed to a curved shape to fit very snugly against the surface of the affected area of the horse's leg. As seen in FIGS. 2–4, the shield is arcuate and approximately semicircular in cross section, and of sufficient length to extend throughout the height of the area where the tendon has been injured or where the leg has received some other injury. The shield, although intended primarily for protecting injured tendons, may be used also to protect bruises, cuts, or other injuries.

Although various materials are possible, it is preferred to form the shield 13 from a sheet of plastic material which is quite hard and rigid at normal atmospheric temperatures, but which becomes soft and easily shaped to a desired shape when heated to an elevated temperature such as, for example, 200° F. The use of a plastic material having such characteristics enables the shield to be formed exactly to the shape of the portion of the leg to which it is to be applied, so that it fits snugly against the leg throughout the entire area of the shield, and does not rub on only a limited area, which might chafe the skin of the horse. Preferably the edges of the shield are slightly flared outwardly as indicated at 17 in FIGS. 2 and 4, to avoid any possibility of sharp edges cutting into the skin. However, the outward flare at the edges should be relatively slight, in order not to interfere with the wrapping or bandage 15 which goes around the leg of the horse and over the protective shield.

Figure 5:
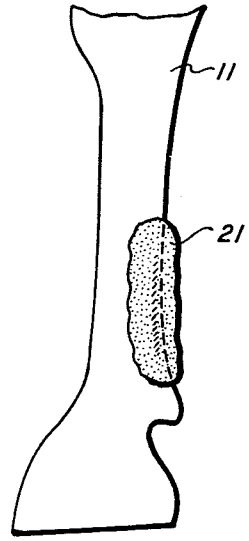
FIG. 5 is a schematic view showing the application for cast material to the leg of the horse to make a negative cast.

The shaping of the inner or concave surface of the shield to exactly the shape of the leg of the horse is an important feature. In order to accomplish this close fit, the method according to the present invention includes the step of first making a negative cast of the affected part of the leg, by placing a quantity of any suitable casting material around the affected area of the leg, as indicated at 21 in FIG. 5. Various casting materials may be used, but it is particularly useful to use an epoxy type of plastic material, often called epoxy resin. When this has hardened sufficiently to retain its shape, the negative cast 21 is removed from the leg of the horse.

Figure 6:
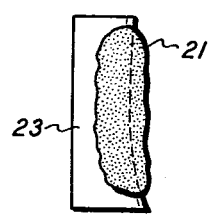
FIG. 6 is a schematic view illustrating the making of a positive ceramic cast from the negative cast.
Figure 7:
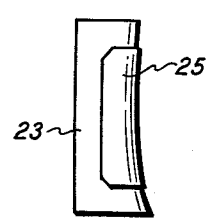
FIG. 7 is a schematic view showing the shaping of the plastic sheet of the shield around the positive ceramic mold.

Then a firm and rigid positive cast is made from the negative cast, the positive cast being indicated schematically at 23 in FIG. 6. In other words, using the negative cast 21 as a mold, the positive cast is formed to duplicate the exact shape of the affected area of the leg of the horse. A suitable firm material which will withstand heat at a later stage, may be used for the positive cast. It has been found satisfactory to make the positive cast of ceramic material. For example, clay of the kind normally used for making ceramic articles such as pottery, is formed against the inner or concave surface of the negative cast 21, so as to have a shape which is the reverse of that of the desired part of the negative cast, and therefore duplicates exactly the shape of the leg of the horse. The material 23 of which the positive cast is made is then hardened in any suitable manner so that it will retain its shape and withstand heat during a later stage. For example, if the positive cast 23 is of clay such as used in making pottery or porcelain, it may be fired in a conventional ceramic kiln after it is removed from the negative cast 21, thereby producing a hard, dense, permanent cast schematically indicated at 23 in FIG. 7.

Figure 8:
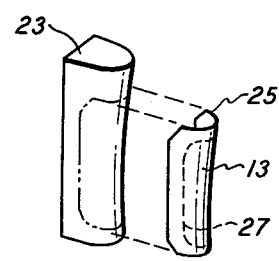
FIG. 8 is an exploded view of the positive ceramic mold and the formed shield removed therefrom.

Working now with this positive cast 23 as a mold or mandrel, a sheet of the material from which the shield is to be made is placed against the appropriate part of the surface of the positive ceramic cast or mold 23, and is heated to soften it so that it may be bent around the appropriate part of the surface of the mold 23, thereby being formed with a concave surface which is the exact mating duplicate of the corresponding part of the surface of the mold or cast 23, and therefore it will fit exactly on the leg of the horse, with an even contact pressure all over the entire area of the shield. This material of which the shield is made is indicated at 25 in FIGS. 7 and 8. It is preferably of somewhat larger area than the final shield desired, so that it may be trimmed down to the desired size along the trim line 27, to form the final shield 13, and the edges may be flared (as at 17) in any suitable manner. However, it is not always necessary to use a sheet larger than the desired area, and it is within the scope of the invention to form an initial sheet of the desired size and with the edges slightly flared outwardly, and then heat this sheet and apply it to and wrap it around the convex surface of the mold or cast 23, so that no subsequent trimming is needed after the sheet is properly shaped and removed from the mold 23.

The material of the sheet 25 and shield 13 is preferably one of the several suitable thermoplastic sheets available on the market, which are firm and rigid up to temperatures of, say, about 100° or 125° F, and which are soft and easily bent to the desired shape at higher temperatures.

The completed shield is then applied to the affected part of the leg of the horse, and held in place by conventional tight wrapping 15 formed by strips of cloth or other suitable wrapping material as customarily used on the legs of horses.

As already indicated, the use of a protective shield of this kind enables the horse to run without pain and without adverse effect upon the bowed or otherwise damaged tendon, and thus saves a horse for a useful racing life, where otherwise the horse might be of little or no further value.

Although ceramic material is the preferred material from which the positive cast or mold 23 is made, other materials are possible, so long as they are able to withstand the heat and pressure needed to form the shield 13 accurately to the desired shape, and provided the material is easily moldable to the shape of the intermediate cast 21. A suitable material is Plaster of Paris.

What is claimed is:

1. A bowed tendon shield assembly for protecting an affected part of a horse's leg having a bowed tendon, said assembly comprising a shield member constituting a single integral light-weight piece of moldable rigid material and of curved cross-section having a concave surface shaped to engage exactly and precisely against the area of the bowed tendon and a substantial marginal area immediately around the bowed tendon of a particular individual horse, and means for securing said shield member to the leg of the horse, said securing means comprising a bandage-like wrapping adapted to extend a multiplicity of turns around said leg outside said shield member for holding said shield member tightly engaged throughout substantially its entire concave surface with said affected part of said leg and for exerting pressure against said tendon through said shield member, the entire assembly being of sufficiently light weight so that it may be worn on the horse during a race without interfering appreciably with the speed of running.

2. The invention defined in claim 1, wherein said shield member is formed of thermoplastic sheet material.

3. The invention defined in claim 1, wherein said shield member has marginal edges slightly outturned to avoid sharp edges engaging said leg.

* * * * *